INVENTOR
JAMES M. BENSON

INVENTOR
JAMES M. BENSON

Jan. 18, 1966  J. M. BENSON  3,229,522
THERMAL FLOWMETER
Filed Feb. 16, 1965  3 Sheets-Sheet 3

INVENTOR
JAMES M. BENSON

BY
ATTORNEYS

United States Patent Office 3,229,522
Patented Jan. 18, 1966

3,229,522
THERMAL FLOWMETER
James M. Benson, Hampton, Va., assignor to Hastings-Raydist, Inc., Hampton, Va., a corporation of Virginia
Filed Feb. 16, 1965, Ser. No. 433,082
11 Claims. (Cl. 73—204)

This application is a continuation-in-part of application Serial No. 206,245, now Patent 3,181,357, filed on June 29, 1962.

This invention pertrains to apparatus for measuring the flow of fluids, and particularly fluid flowmeters of the heated conduit type.

It has heretofore been known that if a fluid is flowed through a length of conduit which is heated and the temperature of one or more points along the conduit detected, the temperatures at these points will vary as some function of the direction and rate of flow of the fluid. It has further been known that the temperature of points along the conduit may be detected by affixing, as by welding at the desired points, conductors of metals dissimilar to the metal of the conduit, thereby forming thermocouple junctions. Nevertheless, the difficulty has been to make practical devices of this sort, particularly to overcome problems incident to electric heating current flowing through and adversely affecting the temperature measuring thermocouple circuits. Also there has been difficulty incident to passage of electric heating current through the conduits requiring certain portions of the conduit to be the elevated potentials above ground.

It is the general object of the present invention to overcome the aforesaid difficulties and to permit the use of thermocouple circuits to measure temperatures along the conduit without interference by heating currents.

Figure 1:
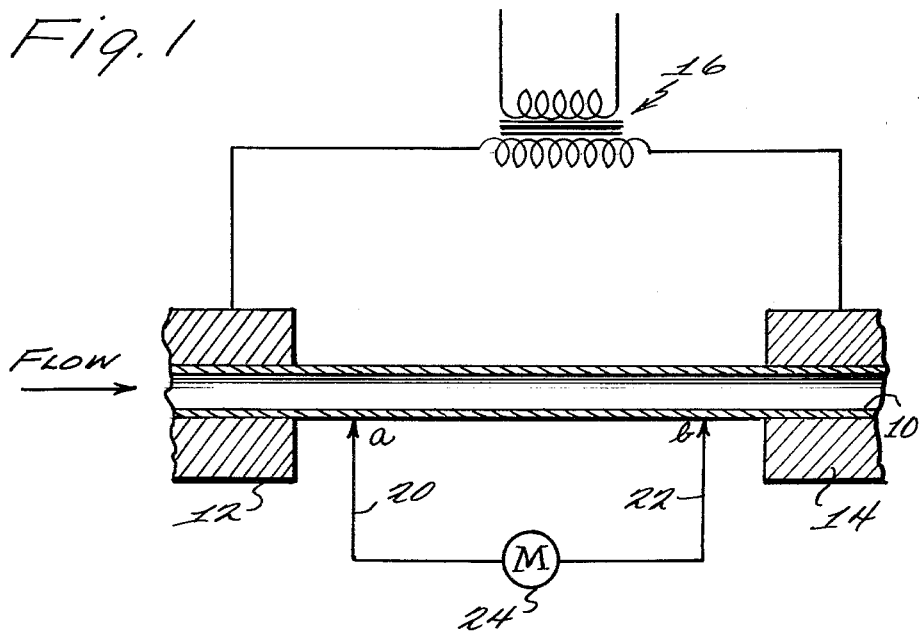
Figure 2:
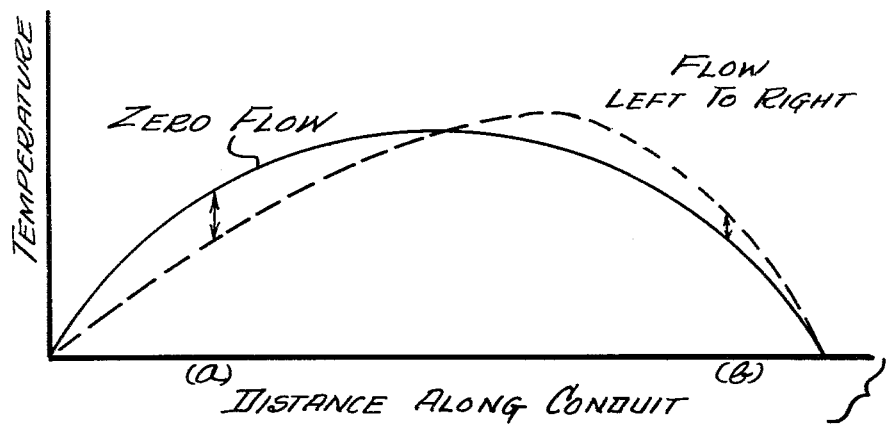
Figure 3:
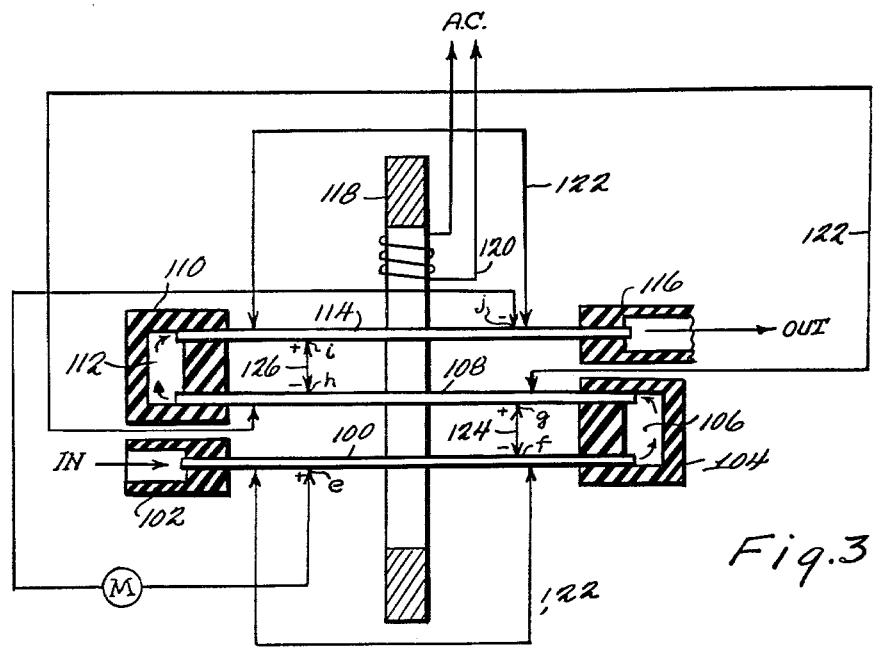
Figure 4:
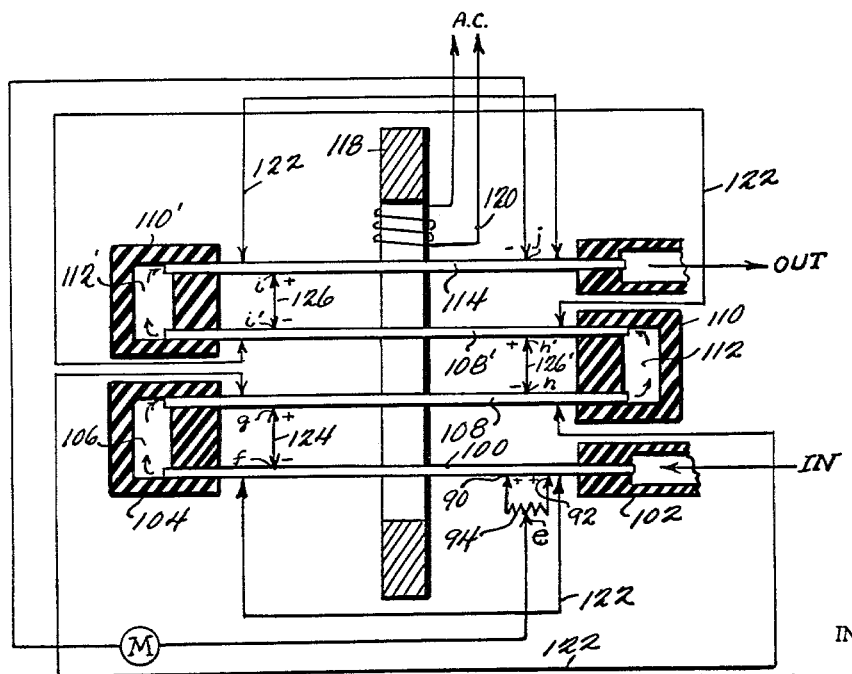
Figure 5:
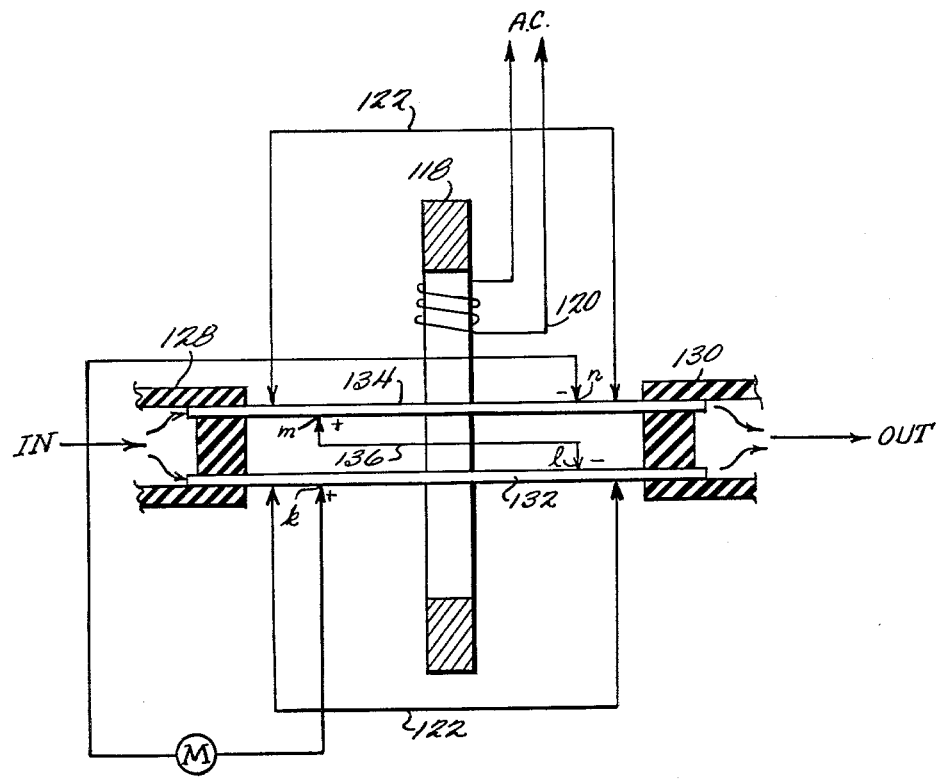

All of the several further objects of the invention will become fully apparent from the following description of illustrative embodiments of the invention, and from the appended claims. The illustrative embodiments of the invention may be best understood with reference to the accompanying drawings wherein:

FIGURE 1 shows a form of prior art apparatus of background interest to the present invention, FIGURE 2 shows typical temperature versus conduit length curves obtained in heated conduit flowmeters, FIGURE 3 shows a first embodiment of the present invention, FIGURE 4 shows a second embodiment of the present invention, and FIGURE 5 shows a third embodiment of the present invention.

For purposes of background information a previously known type of heated conduit flowmeter is shown in FIGURE 1. Here a length of conduit 10 of electrically and thermally conductive material is thermally and electrically coupled at its ends to heat sinks 12 and 14. By way of definition, a heat sink as referred to herein is a body of material of such mass that its temperature will remain substantially at the ambient temperature of its surroundings, and not be influenced by heating current being passed through it and the conduit. The conduit will be of lesser mass and will be heated above its ambient surroundings by passage of electrical heating current therethrough.

Continuing to refer to FIGURE 1, a transformer 16 delivers heating current to the conduit 10 by connection of the transformer secondary winding 18 to the ends of the conduits via the heat sinks 12 and 14. In FIGURE 1 the temperature of points $a$ and $b$ along the conduit are measured by wires 20 and 22 of like metal, say copper, but dissimilar to the metal of the conduit 10, say Constantan. As is well known a complete thermocouple circuit always comprises at least two junctions and the total thermoelectric potential generated in the circuit is the difference of the thermoelectric effect at the two junctions. In the circuit of FIGURE 1 one junction would be at point $a$ and the other at point $b$ and the meter M otherwise designated by reference character 24 will show, when suitably calibrated, the difference between the temperatures of the junctions at $a$ and $b$. However, in the apparatus shown in FIGURE 1 the meter M would also be influenced by some of the heating current flowing through it, inasmuch as the points $a$ and $b$ shown in conduit 10 will be at different potentials in respect to the circuit of the heating current.

FIGURE 2 shows a plot of the temperature gradient along a conduit as shown in FIGURE 1 for different conditions of fluid flow. The solid line curve shows a typical temperature gradient for zero fluid flow, while the dash lines show a typical curve of temperature gradient for flow of fluid from left to right as viewed in FIGURE 1. As depicted in FIGURE 2, when the flow builds up from zero the temperature along the first one-half of the conduit decreases, while that in the second one-half of the conduit will increase. Of course, upon continued increase in the rate of fluid flow there will be a rate reached where the temperature of the entire conduit may become decreased. It is evident, then, that the characteristics of a flowmeter as illustrated in FIGURE 1 and having a temperature distribution along the conduit similar to that shown in FIGURE 2 will have a severe limitation in its use because a given reading of the meter M can be caused by two definite but widely different values of the flow. One value is relatively small and the other is much larger. The reading of the meter is ambiguous in that it will not be known which value of the flow is the true reading unless some additional means is employed.

In Patent 3,181,357, of which this application is a continuation-in-part, there are described in detail several embodiments of thermal flowmeters. The present application discloses additional thermal flowmeters of similar type to those disclosed in Patent 3,181,357.

Now turning to the embodiments of the present invention, the first is shown in FIGURE 3. A first conduit 100 extends between heat sinks 102 and 104. Sink 104 is provided with means, such as passage 106 therein, for delivering fluid supplied at the output end of conduit 100; as indicated, into a second conduit 108 which extends between heat sinks 104 and 110. Sink 110 is similarly provided with a passage 112 for delivering the fluid output of conduit 114 to a third conduit 114 extending between heat sinks 110 and 116. Thus, serial fluid flow is provided. Heat sinks 102, 104, 110 and 116 are fabricated of material suitable to electrically insulate the conduits from one another except by way of the metering circuit which will be described hereinafter. Surrounding the conduits 100, 108 and 114 is a core of magnetic material 118. A winding 120 is wound about core 118 for carrying alternating current. Each of the conduits is provided with a shorting loop 122 connecting its opposite ends. In operation, energization of winding 120 results in heating currents being generated in each of the conduit loops. Two thermoelectric junctions are provided on each conduit. For conduit 100 these are designated as $e$ and $f$. Those of conduits 108 are labelled $g$ and $h$, and the junctions on conduit 114 are designated as $i$ and $j$. The thermoelectric junctions are connected in series by conductor 124, which joins junctions $f$ and $g$, and by conductor 126 joining junctions $h$ and $i$. The series circuit is completed by the connection of junctions $j$ and $e$ through a meter M.

Utilizing the foregoing arrangement, it is apparent that a very sensitive flow measuring apparatus is achieved. This is due to the fact that the thermoelectrical outputs are added in series in the metering circuit. It will also be apparent that the alternating current voltages induced in adjacent conduit loops are equal in magnitude and opposite in sense. Consequently, the alternating current voltages tend to cancel one another thereby limiting interference in the metering circuit. With an odd number of conduits as in the embodiment of FIGURE 3, all but one of the alternating current voltages is so cancelled. Since the metering circuit does not encircle the core 118, there is, of course, no alternating current induced in the metering circuit by the field surrounding core 118.

A modification of the embodiment of FIGURE 3 is shown in FIGURE 4. In the description of the latter embodiment like numerals indicate corresponding elements in FIGURES 3 and 4. The basic distinction between these similar arrangements is that the embodiment of FIGURE 4 employs an even number of conduits. This is accomplished by providing an additional heat sink 110', identical with sink 110. An additional conduit 108' extends between sinks 110 and 110', the conduit having spaced thermocouple junctions $h'$ and $i'$ thereon. The series connection of the junctions is effected by joining junctions $h$ and $h'$ by conductor 126' and $i'$ and $i$ by conductor 126. The operation of the present embodiment is identical with that of FIGURE 3 except, as suggested previously, it is more sensitive and by using an even number of conduits the alternating fields generated by alternating current in the conduit loops cancel one another effectively eliminating interference in the metering circuit. Of course in practice minor interference effects are possible due to non-uniform conduit resistances and departures from symmetry in construction.

It should be noted that for purposes of illustration, the embodiment of FIGURE 14 of Patent 3,181,357 has been incorporated in FIGURE 4 to illustrate an arrangement for adjusting the position of tap $e$. Two spaced apart junctions 90 and 92 are provided, with leads of a given material, say copper, leading to resistor 94, there being an adjustable tape $e$ thereon leading to the meter M. In this way, by adjustment of the tap $e$, the movement of the thermoelectric junction along conduit 100 is readily simulated. It is apparent that this feature may be employed with either of the flowmeters previously described as well as the embodiment to be hereinafter set forth.

In the arrangement of FIGURE 5, parallel fluid flow is provided. More specifically, spaced heat sinks 128 and 130 support the ends of separate conduits 132 and 134. Once again the heat sinks serve to electrically insulate the conduits from one another. The conduits are encircled by a magnetizable core 118 about which a winding 120 is positioned. Winding 120 is connected to an alternating current supply. Each of the conduits is provided with a shorting loop 122 connecting its opposite ends. Again each conduit is provided with at least two thermocouple junctions, designated $k$–$n$. Junction $l$ is joined to junction $m$ by conductor 136, and junctions $n$ and $k$ are joined through meter M to complete the series circuit. Fluid is passed in parallel through conduits 132 and 134 from sink 128 to sink 130.

The operation of the system in measuring flow is identical to that described with reference to FIGURES 3 and 4. It should be appreciated that for increased sensitivity and/or larger flow rate, additional parallel conduits may be employed.

It is to be understood that the various embodiments of the invention have been described in detail only for the purpose of illustration, and no specific limitation thereto is intended. The scope of the present invention is to be determined from the appended claims.

What is claimed is:

1. In a fluid flowmeter, a first section of electrically and thermally conductive conduit for flow of fluid therethrough having first and second ends each thermally coupled to a heat sink, means electrically connecting the first conduit near its ends to form a first electrical loop with the conduit, a second section of electrically and thermally conductive conduit for flow of fluid therethrough having first and second ends each thermally coupled to a heat sink, means electrically connecting the second conduit near its ends to form a second electrical loop with said second conduit, a magnetizable core member linking through both of said loops, means for driving said core as a transformer core for generating circulating heating currents in the two conduit loops, means for passing fluid through the conduit sections, and a thermocouple circuit having at least two thermocouple junctions on each conduit section, said junctions being electrically connected in series relationship.

2. A fluid flowmeter as set forth in claim 1, wherein said fluid passing means includes a connecting means for joining the second end of the first conduit section to the first end of the second conduit section to permit serial fluid flow through the conduit sections.

3. A fluid flowmeter as set forth in claim 1, wherein said fluid passing means directs the fluid through the conduit sections in parallel.

4. A fluid flowmeter as set forth in claim 1, wherein at least one of said thermocouple junctions is formed by two junction points spaced apart along the conduit and joined by a resistor having an adjustable tap whereby adjustment of the tap simulates movement of said junction along the conduit.

5. In a fluid flowmeter, a plurality of sections of electrically and thermally conductive conduit for flow of fluid therethrough, each of said conduit sections being electrically insulated from one another and having first and second ends coupled to heat sink means, separate electrical means associated with each conduit section connecting its respective conduit section near its ends to form a plurality of electrical loops, a magnetizable core member linking said loops, means for driving said core as a transformer core for generating circulating heating currents in said loops, means for passing fluid through the conduit sections, and a thermocouple circuit having at least two thermocouple junctions on each conduit section, said junctions being electrically connected in series.

6. A fluid flowmeter as set forth in claim 5, wherein said fluid passing means includes connecting means for joining the ends of said conduit sections to permit serial fluid flow through said sections.

7. A fluid flowmeter as set forth in claim 5, wherein said fluid passing means directs the fluid through the conduit sections in parallel.

8. A fluid flowmeter as set forth in claim 5, wherein at least one of said thermocouple junctions is formed by two junction points spaced apart along a conduit section and joined by a resistor having an adjustable tap whereby adjustment of the tap simulates movement of said junction along the conduit section.

9. A fluid flowmeter as set forth in claim 5, wherein said plurality of conduit sections is an even number of sections.

10. A fluid flowmeter as set forth in claim 5, wherein said plurality of conduit sections is an odd number of sections.

11. A fluid flowmeter as set forth in claim 5, further comprising indicating means electrically connected in series with said thermocouple junctions.

References Cited by the Examiner

UNITED STATES PATENTS 2,446,283    8/1948    Hulsberg _____ 73—204
2,616,022    10/1952   Arnaud.

FOREIGN PATENTS 1,078,592    5/1954    France.

LOUIS R. PRINCE, *Primary Examiner.*

S. CLEMENT SWISHER, *Assistant Examiner.*